Dec. 5, 1944.  E. P. ESCHER  2,364,353
ELEVATING APPARATUS FOR HANDLING BULK MATERIALS
Filed Feb. 25, 1943  4 Sheets-Sheet 1
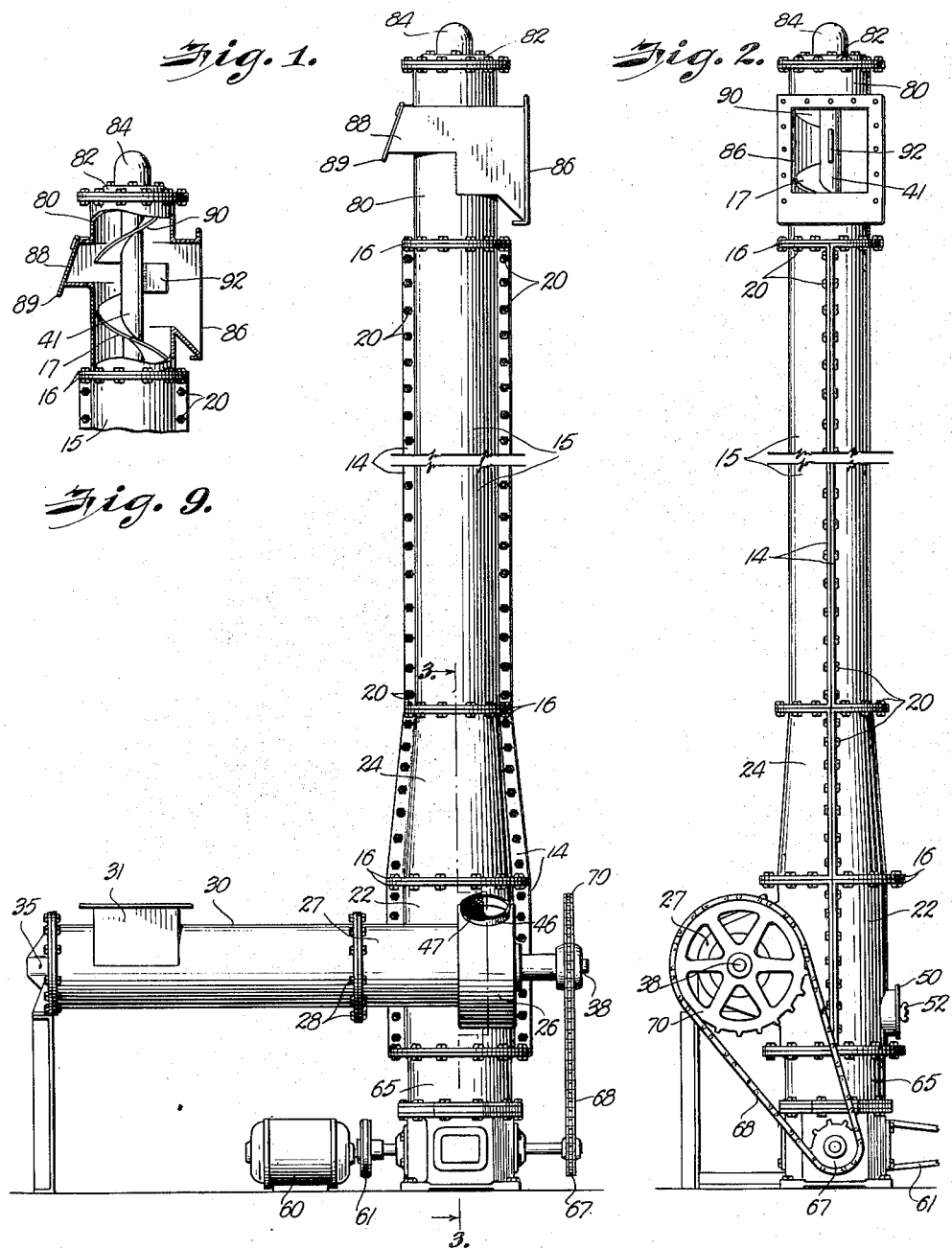
INVENTOR.
E. P. Escher,
BY Chas. W. Gerard.
ATTORNEY.

Dec. 5, 1944.  E. P. ESCHER  2,364,353
ELEVATING APPARATUS FOR HANDLING BULK MATERIALS
Filed Feb. 25, 1943  4 Sheets-Sheet 2
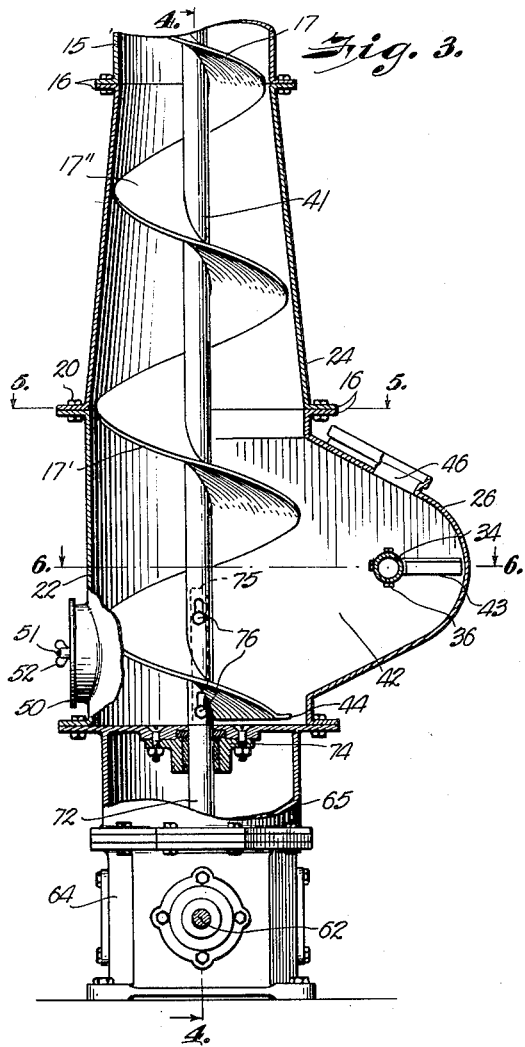
INVENTOR.
E. P. Escher,
BY Chas. W. Gerard,
ATTORNEY.

Dec. 5, 1944. E. P. ESCHER 2,364,353
ELEVATING APPARATUS FOR HANDLING BULK MATERIALS
Filed Feb. 25, 1943 4 Sheets-Sheet 4

INVENTOR.
E. P. Escher,
BY Chas. W. Gerard
ATTORNEY.

Patented Dec. 5, 1944

2,364,353

UNITED STATES PATENT OFFICE 2,364,353

ELEVATING APPARATUS FOR HANDLING BULK MATERIALS

Edward P. Escher, Chicago, Ill., assignor to Screw Conveyor Corporation, Hammond, Ind., a corporation of Illinois Application February 25, 1943, Serial No. 477,026

7 Claims. (Cl. 198—213)

This invention relates to elevating apparatus, with particular reference to vertical lift conveyor mechanism of the screw conveyor type, for the handling of bulk materials.

One of the primary objects of the invention is to devise an improved form of vertical lift screw conveyor apparatus which is adapted to operate in a continuous and efficient manner without any objectionable packing or clogging action or tendency, such as is often experienced with certain classes or grades of material, especially at the feed point where the material is being delivered to the vertical run of the conveyor mechanism.

For the accomplishment of this primary object of the invention, I have devised an improved construction at the feeding end of the vertical conveyor apparatus whereby the proper relationship is established as to the relative capacities of the conveying mechanism at and above the point of transfer from the feeding means to the vertical conveying mechanism, so that any objectionable tendency toward back pressure or other choking or clogging action is effectively overcome.

This improved construction consists essentially in the provision of junction units of adequate capacity as regards both accommodation of the movement of the material and also having elements of conveyor mechanism of an effective design for producing a non-lagging transfer movement of the material through these junction units as fast as the material is delivered thereto and on into the direct vertical run of the apparatus, without opportunity for any back pressure, and hence free of all choking or clogging effects.

With the foregoing general objects in view (as well as various minor objects as will hereinafter appear), the invention will now be described by reference to the accompanying drawings illustrating a practical and efficient form of apparatus which has been tested and found entirely satisfactory in its performance and hence in all essential respects well adapted for the embodiment of my proposed improvements in apparatus of this character; after which those special features and combinations of construction which I regard as novel and of patentable merit will be particularly set forth and claimed.

In the drawings:

Figure 1 is a front elevation illustrating a vertical screw lift form of elevating apparatus embodying the present features of improvement;

Figure 2 is a side elevation of the same;

Figure 3 is a vertical sectional view, representing a section taken on the line 3—3 of Figure 1, but on a somewhat larger scale;

Figure 4 is a similar vertical sectional view, representing a section taken on the line 4—4 of Figure 3;

Figure 7 is an enlarged sectional detail view of the inspection or clean-out port, the same representing a section taken on the line 7—7 of Figure 6;

Figure 8 is an interior elevation of said port construction;

Figure 10:
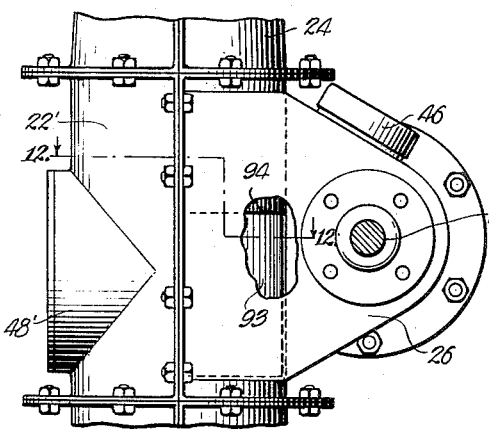
Figure 11:
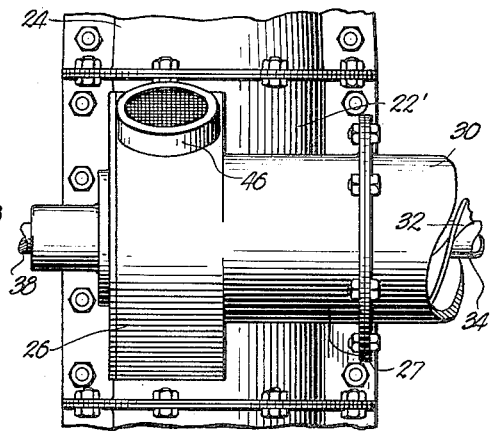
Figure 12:
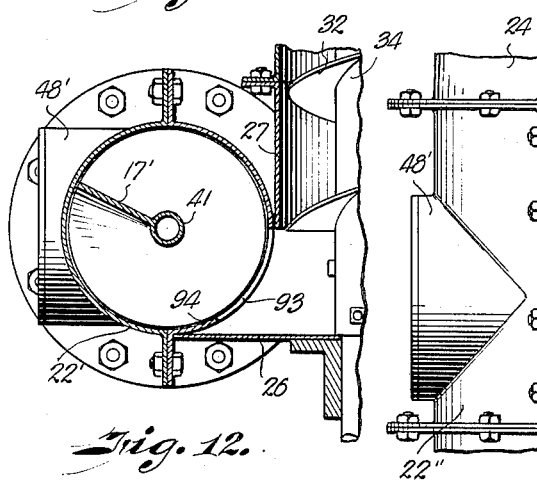
Figure 13:
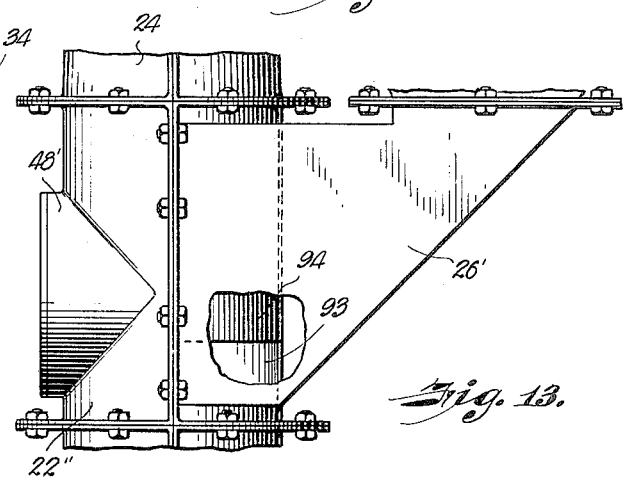
Figure 14:
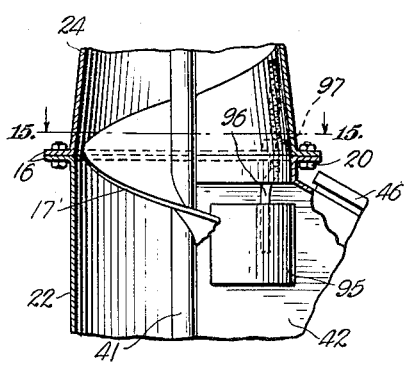
Figure 15:
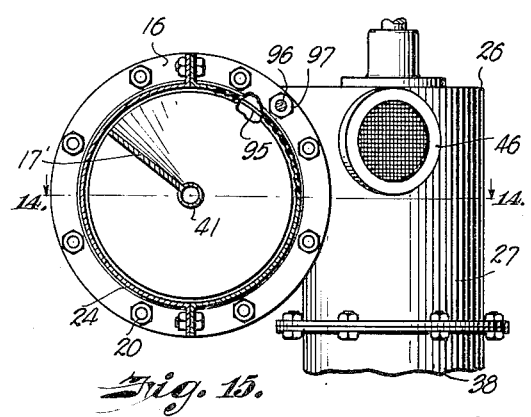

Figure 9 is a vertical sectional detail view of the upper end or discharge portion of the apparatus; and Figures 10 and 11 are side and front elevations, respectively, illustrating a modified form of the junction box or unit, arranged for connection with the feeder assembly from the opposite direction as compared with Figure 1, and showing in Figure 10 a modification of the size of the feed opening by which the capacity is fixed or predetermined;

Figure 12 is a horizontal section, indicated by the section line 12—12 of Figure 10;

Figure 13 is a side elevation showing another modified form of junction box or unit adapted for hopper and gravity feed operation, and also showing a corresponding predetermined size of feed opening;

Figure 14 is a vertical sectional view as indicated by the section line 14—14 in Figure 15 and showing a portion of a junction box equipped with an adjustable plate designed for use in some instances for either adjusting or predetermining the size of the feed opening required for a given capacity; and Figure 15 is a horizontal section, as indicated by the section line 15—15 of Figure 14.

Vertical lift apparatus of the screw conveyor type to which the present invention appertains, is fully illustrated in a certain copending application Serial No. 419,812 filed November 21, 1941; such apparatus comprises a sectional housing construction carried to the required height of lift and enclosing screw conveyor mechanism for the elevation of the material; and also either an automatic feed device or a hopper or gravity feed connection with the lower end of said vertical conveyor mechanism for the supply of the material thereto. It has been found that with the prevailing form of feeding means for such apparatus there is developed a tendency to create back pressure on account of a clogging action due to the material choking up at the lower or feed point of said conveyor mechanism, thereby interfering with the efficient operation of the apparatus. This difficulty I have found to be due to a too restricted capacity of the apparatus at the transfer point of the material between the feeding mechanism and the vertical screw conveyor mechanism; and the present invention accordingly relates to the improvements which I have devised for correcting this defect and thereby overcoming the faulty operation of the apparatus on account of said lack of proper capacity at the transfer point of the material from its horizontal feeding direction to its vertical path of travel as it starts its course through the vertical lift portion of the apparatus.

For accomplishing this purpose, I have not only enlarged the operative space at the so-called transfer point already referred to, but have also correspondingly modified the construction of the vertical screw conveyor mechanism to the necessary extent for more effectively handling the material in the transfer of the same from said feeding mechanism to the vertical lift apparatus, i. e., to the primary conveying mechanism performing the principal elevating operation or main function of the installation. These particular improvements constituting my invention will now be described by reference to the accompanying drawings.

The improved construction is illustrated as embodied in an apparatus comprised of a plurality of lengths of conveyor casings or housings 15 which may be of split formation with longitudinal flanges 14 and end flanges 16, with the mating flanges secured together by bolts 20; and within the assembled casings or housings 15 operates a conventional type of screw conveyor 17 made up in sections of corresponding length and coupled together at the joints between the lengths or sections of conveyor housings 15, as illustrated in Figures 1 and 2. The adjoining ends of the conveyor sections will preferably be journaled and secured together in the same manner as described in the aforesaid application Ser. No. 419,812.

In the operation of vertical lift apparatus as heretofore constructed, it has been found that without any variation in the cross-sectional dimensions of the apparatus or other change in the construction at the transfer point, or the feed end of the vertical run of the conveyor, there was a tendency toward a choking action which obstructed and clogged the operation of the apparatus, and for that reason very seriously impaired the efficiency of the principal or elevating function of the vertical screw conveying mechanism.

For overcoming this operating defect I have devised a materially larger junction structure between the feeding unit of the apparatus and the bottom or feeding end of the upright or vertical portion of the apparatus. This junction structure comprises a main junction unit or casing 22 having an upright cylindrical portion of materially larger diameter than the conveyor housing sections 15, and also a tapered extension section 24 for connecting said junction unit 22 with the lowermost conveyor housing unit 15. As shown in Figures 1 and 2, the junction unit 22 and the extension 24 are preferably formed in split sections for assembly together by means of flanges 14 and 16 and bolts 20 in the same way as the conveyor housing sections 15.

Figure 5:
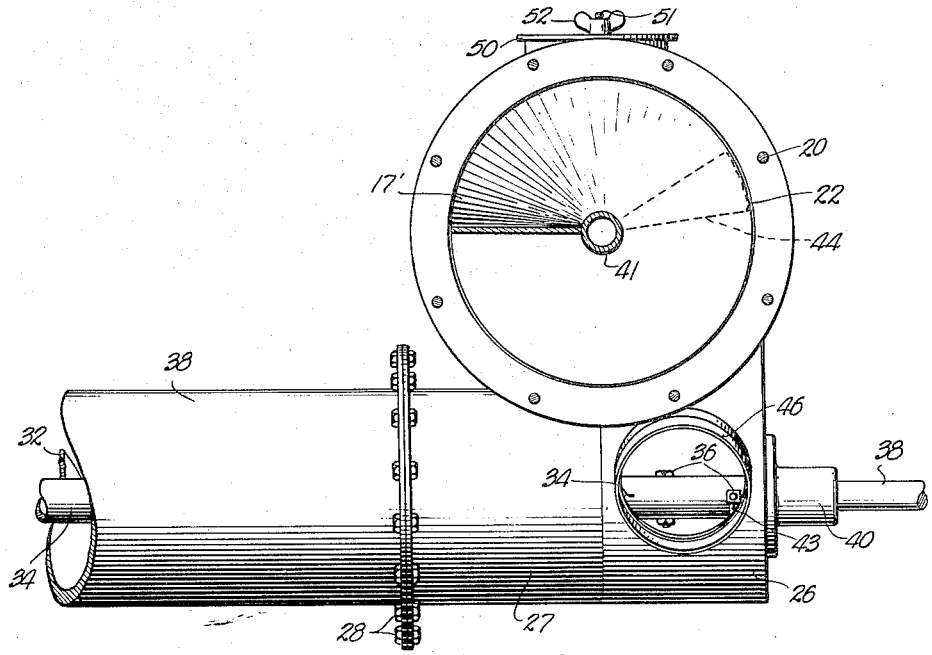
Figure 5 is a horizontal sectional view, representing a section following the section line 5—5 of Figure 3.
Figure 6:
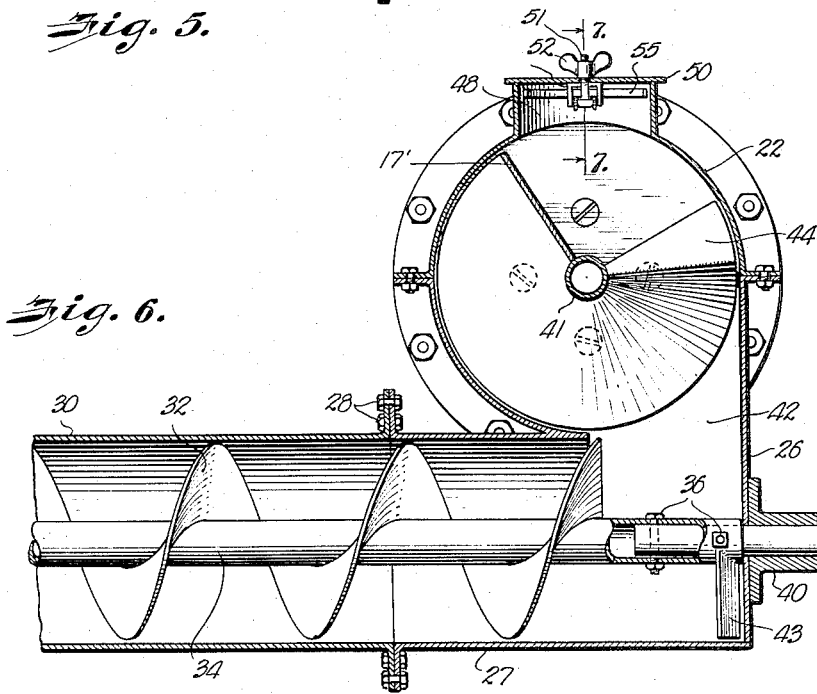
Figure 6 is a similar horizontal sectional view, representing a section as indicated by the section line 6—6 of Figure 3.

The junction box or unit 22 is formed with a lateral or horizontally projecting feed delivery casing portion 26 of approximately half the diameter of the junction unit 22 and also having an integral cylindrical extension 27 which is designed to extend in tangential relation to the casing 22; and to this extension 27 is attached (as indicated at 28) a feeder assembly comprising an appropriately supported feeder housing 30 having a hopper intake 31 and a feeder conveyor 32 with one end of its shaft 34 journaled in a bearing 35 and its opposite end suitably coupled by means of bolts 36 to a drive shaft 38 mounted in a bearing 40—as shown in Figures 5 and 6.

As illustrated in Figures 1, 5 and 6, the feeder conveyor 32 terminates at the junction of the casing portion 26 with its extension 27, or opposite the center of the shaft or axis 41 of the main vertical conveyor mechanism; thus the space of one quadrant is left for the feed opening 42 through which the material is discharged from the casing 26 into the junction unit 22. Preferably, however, an angularly arranged paddle flight 43 is provided at the end of the feed shaft 32 or next to the bearing 40 (see Figure 6) and at such angle as will effectively promote said feed action through the opening 42.

Within said junction unit 22, the initial or lower end of the vertical screw conveyor mechanism comprises a horizontal plate segment 44 connecting with conveyor flighting 17' conforming to the uniform interior diameter of the junction unit 22; and this conveyor flighting 17' connects with a spiral flight 17'' within the tapered junction section 24 and having a contour tapering off to the diameter of the screw conveyor flighting 17 which remains uniform throughout the remaining conveyor housing units above said tapered extension or housing section 24—as is clearly represented in Figures 3 and 4.

In practice, the casing extension 26 is provided with a breather port or opening 46; and diametrically opposite this breather opening the junction unit 22 is provided with an inspection and cleanout port or opening 48 fitted with a cover plate 50 provided with a bolt 51 and wing nut 52. The head of said bolt 51 is welded to a cross piece 54 adapted for retaining engagement with a pair of spaced arcuate strips 55 fixed at opposite sides of the opening 48—all as clearly illustrated in Figures 7 and 8.

One form of drive assembly is illustrated in the accompanying drawings, as comprising a motor 60 having a belt drive 61 to a countershaft 62 forming part of a bottom or base driving unit 64 which supports an adapter unit 65 forming an intermediate casing support between said drive unit 64 and the junction box or unit 22. One end of the shaft 62 is provided with a sprocket gear 67 connected by a sprocket chain 68 with a sprocket wheel 70 for actuating the feeder drive shaft 38. The drive unit 64 is provided with drive connections including a drive end element 72 and bearing structure 74 therefor (as indicated in Figures 3 and 4) for operating the vertical screw conveyor mechanism. As shown in Figure 3, the coupling connection between said drive end element 72 and the conveyor shaft 41 provides for a pin and slot adjustment (as indicated at 76) for accommodating different forms or arrangements of drive assemblies, such as a top drive arrangement with a takeoff drive unit at the bottom of the apparatus, and the like (as illustrated in said copending application Ser. No. 419,812).

At the upper end of the apparatus, a discharge unit is provided in the form of a casing section 80 adapted to be secured to the top conveyor housing section 15, and also provided with a cap member 82 equipped with a conventional end-thrust bearing unit 84 for the upper end of the screw conveyor shaft 41. The casing 80 has an outlet or discharge opening 86 to which any desired type of discharge connection may be attached; and opposite said opening 86 is provided a safety or overflow outlet 88 which is normally closed by a hinged flap or gravity closure plate 89.

The upper end of the conveyor mechanism is preferably provided with a spiral flight 90 arranged at an opposite angle or "hand" to the conveyor flighting 17 and separated therefrom by an intermediate plate or paddle flight 92, said flight structure cooperating to direct the discharge of the material outward through the discharge opening 86, as will be readily understood.

In the operation of the apparatus in the form illustrated, the drive from the motor actuates both the feeding mechanism and the vertical lift or screw conveyor mechanism, simultaneously, in an obvious manner, and the material is transferred continuously from the horizontal feed conveyor, through the opening 42, into the bottom of the junction box or unit 22, surrounding the lower end of the vertical screw conveyor mechanism by which the material is continuously engaged and elevated vertically, first through the lower junction sections 22 and 24, and thence on through the uniform upper sections or housings 15 to the top or discharge unit of the apparatus.

By the provision of the enlarged junction structure and the improved conveyor mechanism to correspond, between the feed conveyor and the remaining upper units of the apparatus, all tendency of the operation to lag or throttle down at the beginning of the vertical movement of the material is practically overcome. This result is accomplished by a construction which provides not only a larger or roomier space for accommodating the movement of the material at the transfer point without any hampering of that movement, but also feeding the material from the horizontal feeding mechanism to the vertical conveyor mechanism at only one side of the latter, i. e., through an opening 42 of 90° or one quadrant of the junction unit 22, as clearly represented in Figure 6. The drawings moreover show that the horizontal feed conveyor terminates at the feed delivery extension 27 of the casing 26, or at one side of said feed opening, so that the delivery of the material and its discharge into the junction unit 22 is at only one side of the axis of the vertical conveyor, and said delivery being made at a point somewhat above the extreme lower end of the vertical conveyor, an effective loading of said vertical conveyor mechanism takes place, which loading action is promoted by the initial horizontal segment 44 at its extreme lower end—see Figures 3 and 6. Thus the loading of the vertical screw conveyor is carried out in a most efficient manner so that the material is removed from the junction box or unit 22 continuously and with the utmost dispatch, for the purpose of assuring that there will be no interference with or obstruction of the incoming stream of material from the feeder, and hence obviating all of the objectionable packing and clogging tendency which it is the purpose of my invention to overcome. The balance of the junction structure—including the tapered section 24 and the corresponding screw conveyor sections, are simply designed for promoting the proper transfer of the material to the remaining upper portion of the apparatus. Accordingly, it is apparent that the construction of the junction units can be so standardized as to enable the manufacturer to design the units for definite and specified capacities, i. e., to accommodate a given flow of material from the feeding unit to a standard size of the vertical screw lift or screw conveyor mechanism, this being one of the important incidental objects of the present improvements. Such a result is independent of any particular type of feeding unit, and may in fact dispense with any automatic form of conveyor feeding means such as illustrated herein; for the material transferring operation, from any type of feeding means or operation (whether of the hopper or gravity feed type, or any of the conventional arrangements now in use), will be carried out in the same efficient and uniform manner—whatever type of feeding is used, and a regulated or controlled capacity is assured, by virtue of the even and uniform material-transferring operation which has not heretofore characterized any operations of this general type.

In the construction illustrated in Figures 10, 11 and 12, the apparatus is shown as designed for a "left-hand" instead of "right-hand" feed, for which purpose the feeder assembly is connected for feeding in the opposite direction as compared with the arrangement shown in Figures 1, 5 and 6. In this modification, the junction box or unit 22' is shown as having a fabricated type of clean-out extension 48'. Moreover, Figures 10 and 12 illustrate the provision of means whereby the capacity of the apparatus may be gaged and set for the handling of a particular kind of bulk material at a given rate, by constructing a given size of feed opening 93 as represented by the size of the space left unobstructed below the plate or partition member 94 installed in the upper portion of the quadrantal feed space or passage 42 already referred to and indicated in Figure 6.

Figure 13 illustrates the same feature of predetermined and fixed size of feed opening 93 as embodied in a modified form of junction box or unit 22'' having a feed extension 26' adapted for hopper and gravity feed operation instead of with the feed conveyor assembly as in the arrangements above described.

In Figures 14 and 15 is illustrated an adjustable device whereby the proper size of the feed opening 93 may be experimentally determined in connecting with the gaging and fixing of the capacity of a given or particular installation. For this purpose, a movable interceptor or baffle plate member may be adjusted and set to vary or reduce the size of the feed passage, as illustrated in Figure 14. This baffle or interceptor device is shown as a suitably shaped plate 95 carried by a supporting and adjusting rod 96 which may be mounted in the adjacent flanges 16 at a point adapted to suspend said plate 95 in position to shut off a definite portion of the area of the feed passage 42 and hence regulate or control to that extent the capacity of the particular apparatus for which this adjustment is provided. The supporting and adjusting rod 96 may be threaded and a set nut 97 used to maintain the adjustment after it is once made.

It will therefore be apparent that I have devised a most practical and highly efficient form of apparatus for accomplishing the various objects of my invention as heretofore stated. Incidentally it is to be pointed out that the results of my invention are further beneficial in the matter of saving a considerable percentage of the horsepower requirement for operations of this character in view of the elimination of back pressure in such operations and thereby correspondingly reducing the power consumption. It should moreover be mentioned that the apparatus is adapted for any of the types of assembly conventionally illustrated in said copending application No. 419,812, regardless of whether the drive connection is made to the top or bottom of the apparatus, or of other variations depending on the conditions applying to any given installation.

It is therefore my desire not to limit the scope of my invention to the particular conditions illustrated herein, but to reserve the right to make any changes or modifications which may properly fall within the spirit and scope of my invention as defined by the appended claims.

Having thus described my invention, what I claim and desire to secure by Letters Patent is:

1. A vertical lift screw conveyor apparatus comprising a vertical housing structure of a given conveying capacity and having a cylindrical bottom portion of greater size or conveying capacity than the remaining upper portion of said housing structure and provided with a lateral feed opening communicating with a quadrant portion only of said bottom cylindrical portion of the housing structure, vertical screw conveying mechanism operating within said housing structure and conforming to the relative sizes of its upper and bottom portions and having an initial horizontal conveying flight below the level of said feed opening, and means for feeding the material to be handled to said feed opening for delivery to said bottom housing portion and to the lower end of said conveying mechanism.

2. A vertical lift screw conveyor apparatus comprising a vertical housing structure of a given conveying capacity and having a cylindrical bottom portion of greater size than the remaining upper portion of the housing structure, vertical screw conveying mechanism operating within said housing structure and conforming to the relative sizes of its upper and bottom portions, means for feeding the material to be handled to said bottom portion of the housing structure and lower end of said conveying mechanism and confining said feeding action to a quadrant portion only of said bottom portion of the housing structure, and adjustable means for predetermining and fixing the size of the feed passage through said quadrant portion of the housing structure.

3. A vertical lift screw conveyor apparatus comprising a vertical housing structure having a cylindrical bottom end portion, vertical screw conveying mechanism operating within said housing structure, means for feeding the material to be handled horizontally into said bottom portion of the housing structure to the lower end of said conveying mechanism and confining said feeding action to a quadrant portion only of said bottom portion of the housing structure, a plate member provided with an adjustable supporting means for supporting said plate member in the feed passage through said quadrant portion of the housing structure, and means for securing said plate member in various different positions of adjustment and thereby varying the size of said feed passage.

4. A vertical lift screw conveyor apparatus comprising a vertical cylindrical conveyor housing enclosing a vertical screw conveyor mechanism, a horizontal cylindrical conveyor housing enclosing a horizontal screw conveyor and arranged in tangential relation to the lower end of said vertical housing, said housings having a communicating feed passage confined to a quadrant portion only of said vertical housing and in position for delivering the material traversing said passage entirely to one side of the vertical axis of said vertical conveyor mechanism, and a terminal conveyor flight at the end of said horizontal conveyor arranged at an angle for deflecting the material from the axis of said horizontal conveyor in the direction of said feed passage.

5. A vertical lift screw conveyor apparatus comprising a vertical cylindrical conveyor housing, vertical screw conveyor mechanism operating within said housing, and a feed delivery casing providing a feed passage extending transversely and at right angles to the lower end of said cylindrical conveyor housing and with one wall of said feed passage in tangential relation to said housing, said housing and casing being provided with a communicating opening coextensive with a quadrantal portion only of said cylindrical conveyor housing whereby the material traversing said feed passage is directed entirely to one side of the axis of said vertical screw conveyor mechanism.

6. A vertical lift screw conveyor apparatus comprising a vertical cylindrical conveyor housing, vertical screw conveyor mechanism operating within said housing, and a horizontal casing having a cylindrical housing portion enclosing a horizontal screw conveyor, the cylindrical portion of said casing terminating in tangential relation to the lower end of said vertical housing and merging with a delivery casing portion forming a transverse feed passage communicating with said vertical housing, whereby the material traversing said feed passage is directed entirely to one side of the axis of said vertical screw conveyor mechanism.

7. A vertical lift screw conveyor apparatus comprising a vertical cylindrical conveyor housing, vertical screw conveyor mechanism operating within said housing, and a horizontal casing having a cylindrical housing portion enclosing a horizontal screw conveyor and terminating in tangential relation to the lower end of said vertical housing, said cylindrical portion of the horizontal casing merging with a delivery casing portion having a transverse end wall also extending in tangential relation to said lower end portion of the vertical housing and forming the outer wall of a transverse feed passage communicating with said vertical housing, whereby the material traversing said feed passage is directed entirely to one side of the axis of said vertical screw conveyor mechanism.

EDWARD P. ESCHER.